ALARM SYSTEM FOR TELEPHONE PAY STATIONS

Filed Oct. 5, 1964 6 Sheets-Sheet 1

INVENTOR
R. W. DEIKER
BY F. R. McCorkendale
ATTORNEY

ALARM SYSTEM FOR TELEPHONE PAY STATIONS

June 4, 1968 R. W. DEIKER 3,387,091

ALARM SYSTEM FOR TELEPHONE PAY STATIONS

Filed Oct. 5, 1964 6 Sheets-Sheet 3

ALARM SYSTEM FOR TELEPHONE PAY STATIONS

June 4, 1968 R. W. DEIKER 3,387,091

ALARM SYSTEM FOR TELEPHONE PAY STATIONS

Filed Oct. 5, 1964 6 Sheets-Sheet 6

United States Patent Office 3,387,091
Patented June 4, 1968

3,387,091
ALARM SYSTEM FOR TELEPHONE PAY STATIONS

Robert W. Deiker, Villa Park, Ill., assignor to American Telephone and Telegraph Company, New York, N.Y., a corporation of New York
Filed Oct. 5, 1964, Ser. No. 401,338
9 Claims. (Cl. 179—5)

ABSTRACT OF THE DISCLOSURE

An alarm system is disclosed wherein a plurality of remote coin pay telephone stations is continuously scanned from a central location to detect an abnormal condition. Detection of an abnormal condition, such as removal of the telephone housing by thieves or vandals, triggers the alarm system. As each station is scanned, a corresponding lamp is lighted at the central location and also at a second location, such as a police station. Upon being triggered, the alarm system halts the scanning, sounds an audible alarm at both locations, and maintains the lamp corresponding to the detected abnormal station in a steadily lighted condition for identification. The interconnecting line between the two locations is so arranged that it may also be used as a talking path.

This invention relates to an alarm system and more particularly to an alarm system for use with telephone pay stations.

Telephone pay stations are being used in constantly increasing numbers, and, in order to offer maximum service and convenience to the public, it has recently become the general practice to place such stations in relatively remote areas, as well as in the more protected locations as heretofore. For example, telephone pay stations are now commonly provided at such places as railroad station platforms, along the town and city sidewalks and along many highways and expressways. While this practice has contributed vastly to the safety and convenience of the traveling public, it has at the same time resulted in increasing the susceptibility of the equipment to the hazards of thievery and vandalism. Such unlawful acts committed at relatively remote areas, particularly during the late night hours, can often remain undetected for relatively long periods of time. Loss of equipment and operating revenue to the telephone company and loss of convenience and safety to the public result from such acts.

An object of the invention is to enhance the reliability of service provided by telephone pay stations.

Another object of the invention is to indicate at a central point an abnormal condition at any one of a group of telephone pay stations.

A still further object of the invention is to indicate simultaneously at a plurality of points an abnormal condition at any one of a group of telephone pay stations.

In accordance with a specific embodiment of the invention, the alarm system provides for continuously scanning a group of telephone pay stations, which group may comprise, for example, up to a maximum of fifteen stations, all of which may be located in the same general area, although this is not necessarily so. Visual and audible alarms are produced upon detecting a "false entry" condition at a scanned station, the alarms being produced both at the central scanning point (usually a telephone central office) and at a second location (usually a police station). These locations will also be referred to as a first alarm center and a second alarm center respectively. The pay stations are scanned by a sequentially operating relay step counter of the ring type which steps continuously (in the absence of an alarm condition) under control of a transistor flip-flop. Normally, that is in the absence of an alarm condition, the tip lead of each protected station is connected to ground through the usual type of alarm switch. The stations are scanned in turn whereby to detect the presence of this ground (normal condition) or the absence of the ground (abnormal or alarm condition). During scanning there is transmitted to the auxiliary display unit at the second location signals which enable the auxiliary unit to follow the entire scanning operation through lighting line lamps in synchronism with the scanning steps.

A feature of the invention is a special line and means for transmitting a 3-potential signal thereover to the auxiliary display unit at the second location.

A still further feature of the invention is means whereby the special line may be utilized on occasion as a talking path between the central scanning point and the second location.

A full understanding of the arrangement contemplated by the present invention as well as an appreciation of the various advantageous features thereof may be gained from consideration of the following detailed description in connection with the accompanying drawing in which.

Figures 1, 7:
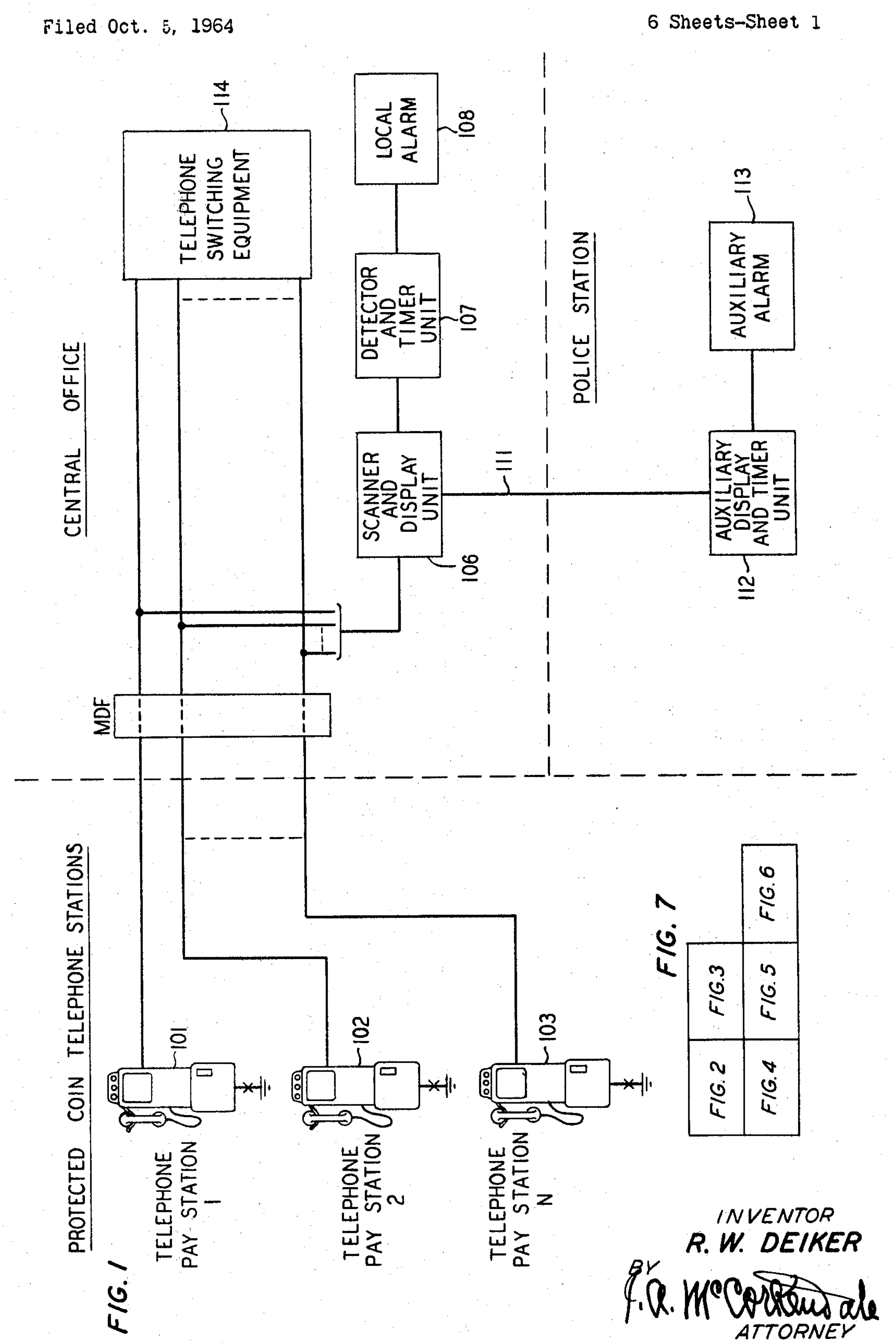
FIG. 1 shows schematically the arrangement and relationship of certain of the basic individual circuits which comprise one specific illustrative embodiment of the alarm system contemplated by the invention.
FIG. 7 shows the manner in which certain of the figures should be arranged to show the specific illustrative embodiment of the invention.
Figure 2:
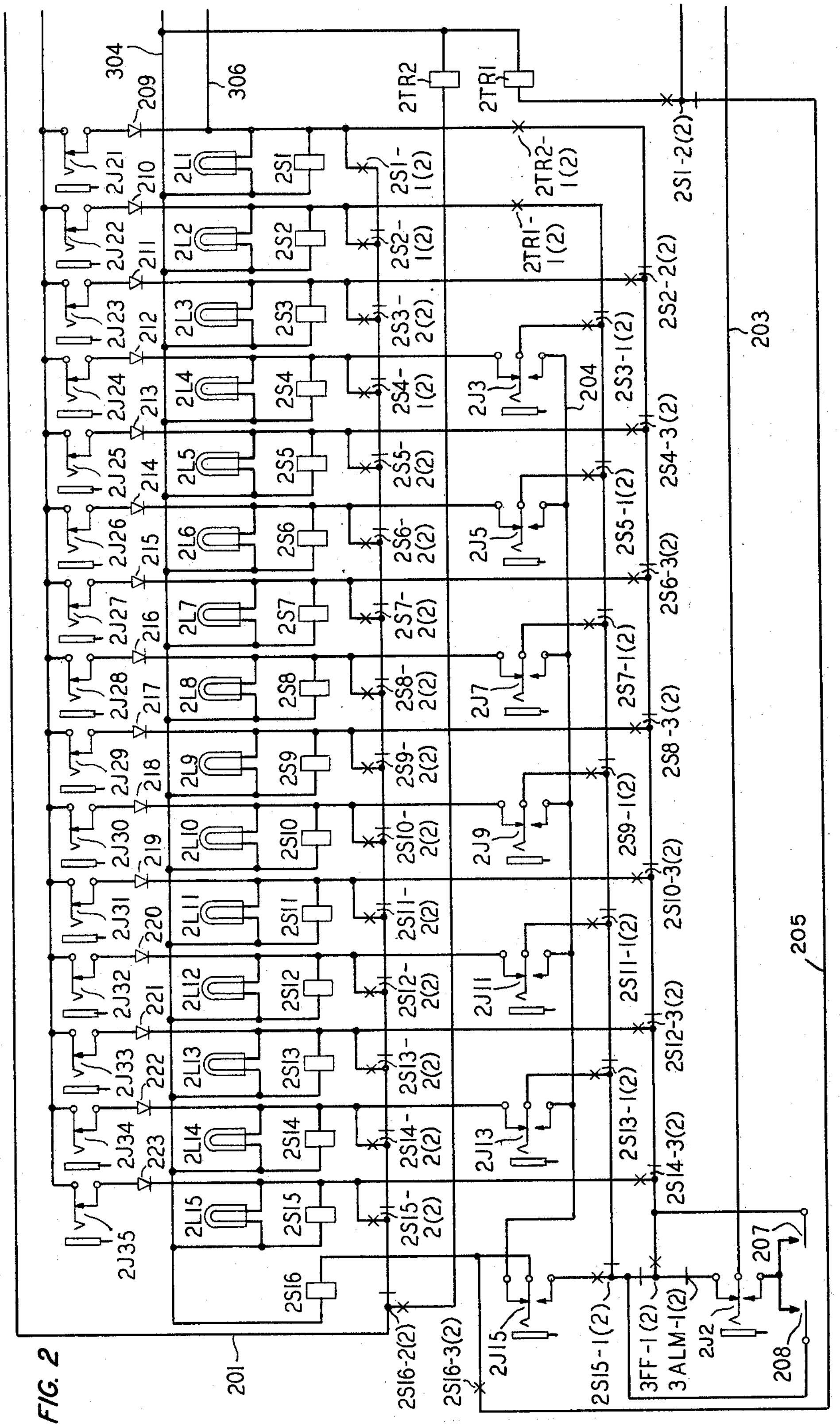
FIG. 2 shows particularly the scanning relays for the respective protected stations, together with the associated keys, jacks, display lamps and certain of the relay contacts.
Figure 3:
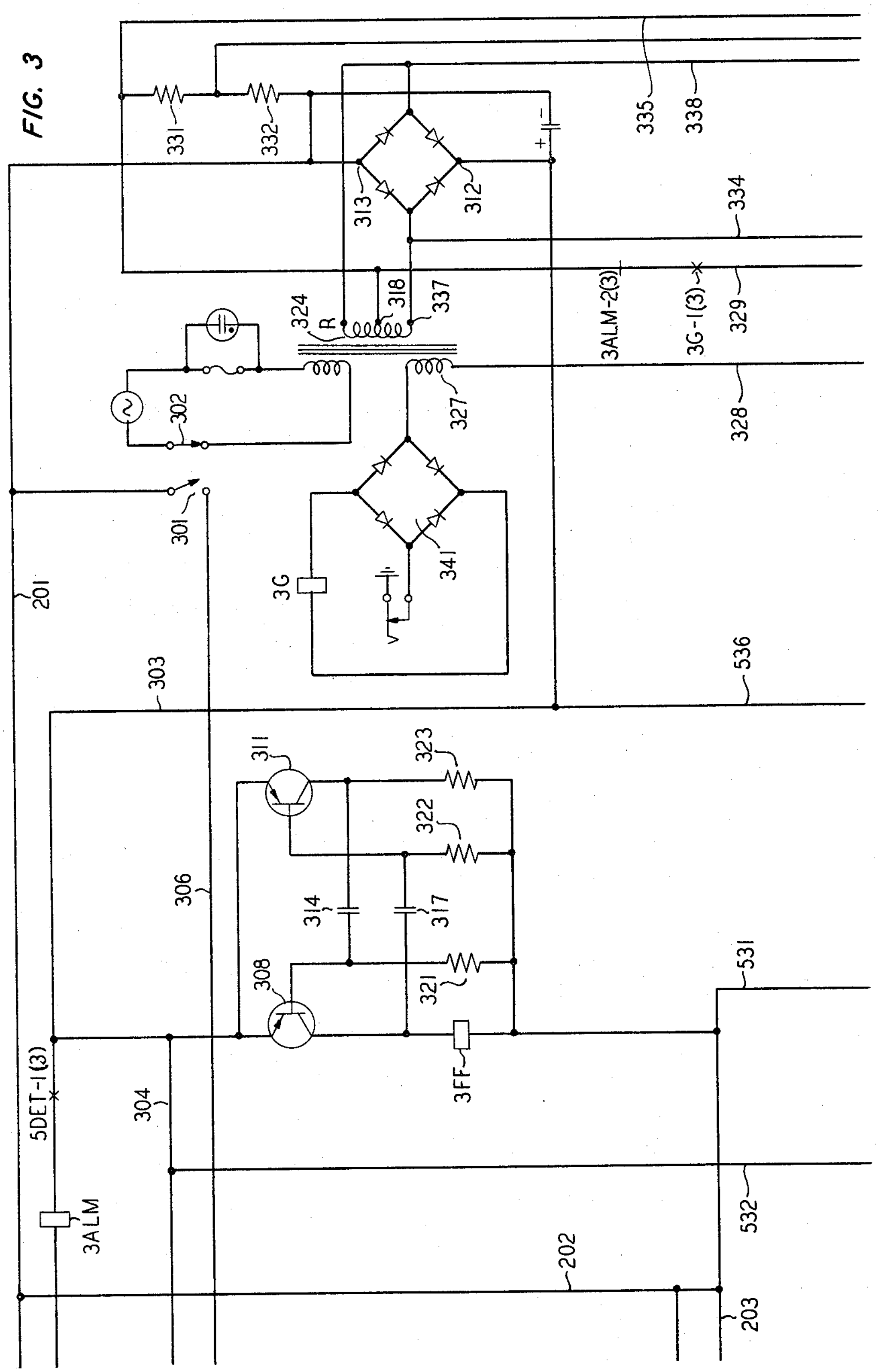
FIG. 3 shows particularly the power supply circuit and the transistor flip-flop circuit.
Figure 4:
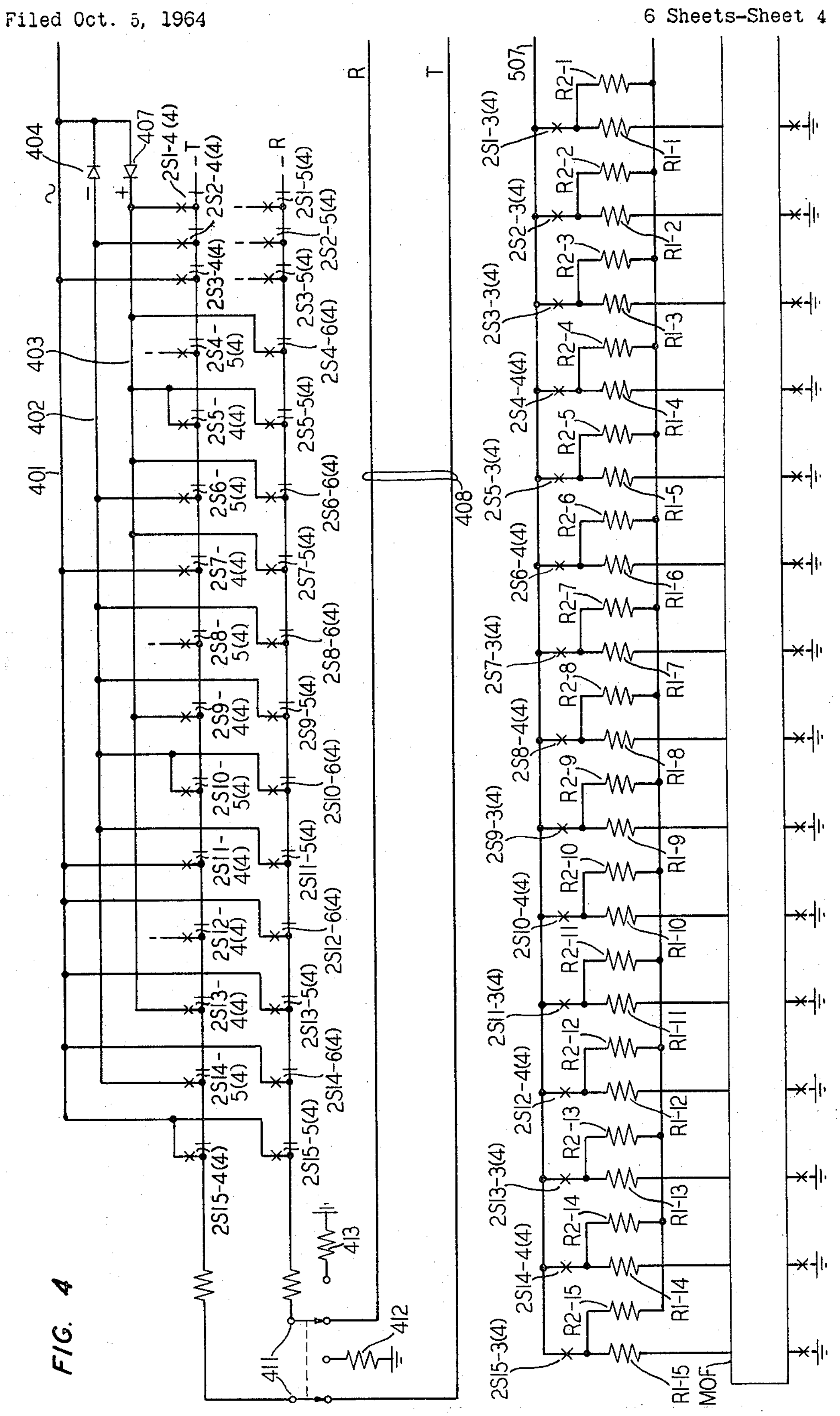
FIG. 4 shows particularly the matrix comprising additional contacts of the scanning relays and a portion of the special line for transmitting signals to the auxiliary display and alarm unit.
Figure 5:
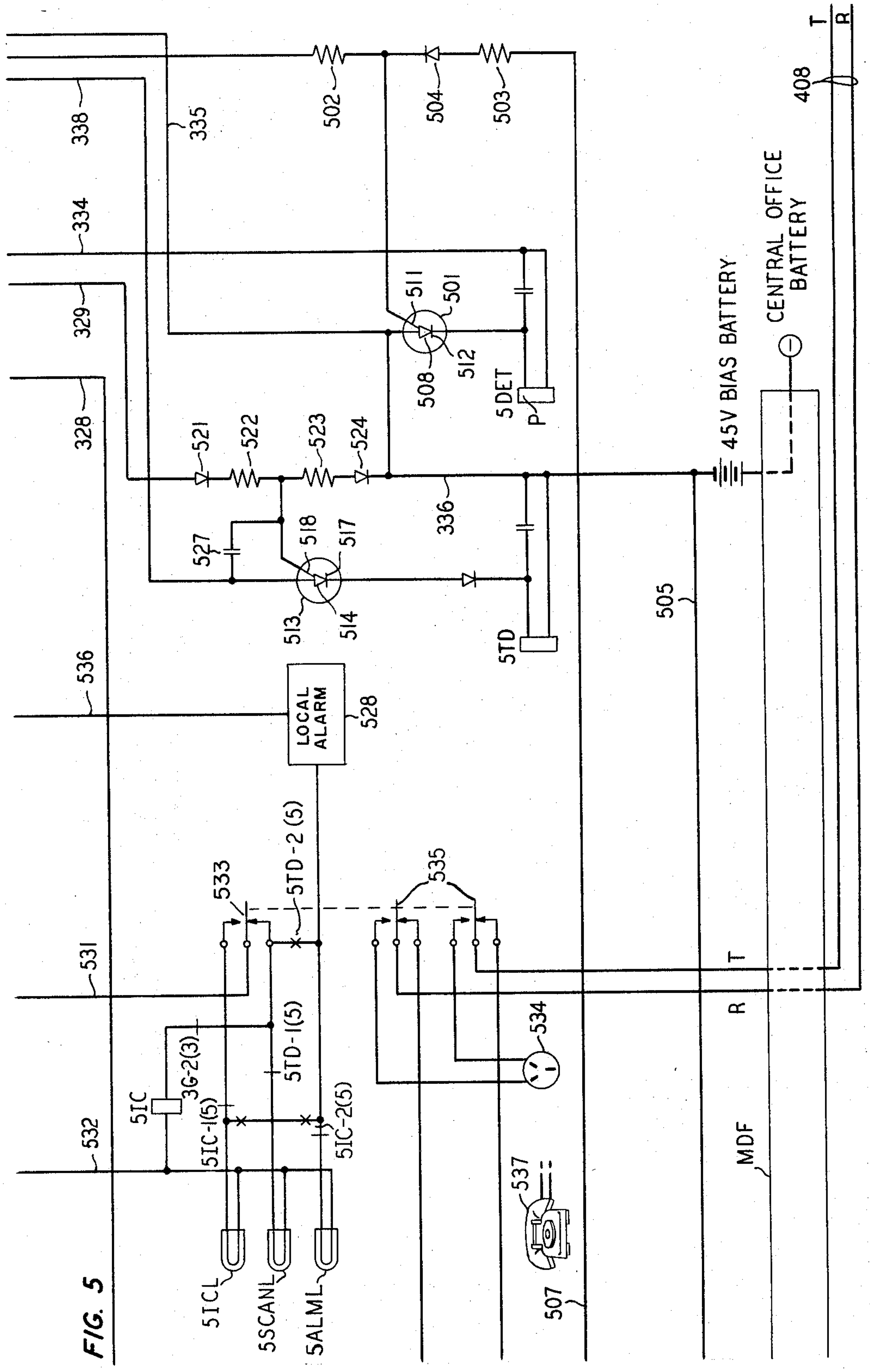
FIG. 5 shows particularly the detector and timer units.

The arrangement and operation of the various components of the illustrative embodiment of the invention will be described in detail subsequently with reference to FIGS. 2 to 6. However, in order to first gain a general overall understanding of the arrangement contemplated, a brief general description will be given at this time with reference to FIG. 1.

Three telephone pay stations 101, 102 and 103, are shown schematically; it will be understood that a group of protected stations may, and usually will, comprise a greater number than three, for example a group many comprise 15 stations. All stations of a group may be included in the same general area or, on occasion, they may be quite widely separated. One conductor of each station line, here assumed to be the tip in each instance, is extended through a suitable alarm switch to a high resistance ground. The arrangement is such that if a station is tampered with, for example if the upper housing is dislodged from its normal position with respect to the lower housing, the connection of the associated tip to the high resistance ground will be interrupted.

Each of the telephone pay stations is connected in the normal manner over its associated line to the telephone central office where the usual interconnections are completed through the main distributing frame (MDF) to the telephone switching equipment 114. As indicated schematically a tap-off connection is made from each line to the scanner and display unit 106. This unit preferably includes, as will be described in detail subsequently, a scanning circuit in the form of a sequentially operating relay step counter of the ring type, together with a plurality of display lamps, one for each protected station. As each respective station is scanned the associated display lamp is lighted. Each station is scanned in turn whereby to detect the presence of the ground on the respective tip (normal condition) or the absence of the ground (abnormal or alarm condition). So long as the ground is present on the respective line being scanned, the detector of the detector and timer unit 107 is held in the OFF condition. However, in the event no ground is detected, and provided this condition prevails for a short interval measured by the timer, the detector is now turned ON and the local alarm 108 is activated whereby to indicate an abnormal condition at the scanned station. At this point scanning is stopped and the lamp associated with the respective station remains lighted.

As the telephone pay stations are being scanned, signals in step with the scanning operation are transmitted over auxiliary line 111 to the auxiliary display and timer unit 112. As will be described in detail subsequently, a novel combination of 3-potential signals is produced and transmitted over line 111 to auxiliary unit 112. The auxiliary unit 112 includes display lamps corresponding in number and arrangement to those of unit 106, a lamp corresponding to each station being provided here as in unit 106. The lamps of unit 112 are lighted in step with those of unit 106 so that the scanning can be followed at the remote station also, here assumed to be a police station. If the scanning stops and remains halted beyond a predetermined short interval as measured by the timer of unit 112, the auxiliary alarm 113 is activated whereby to sound an alarm at the police station; the identity of the station at which an abnormal condition was detected will be indicated by the steadily lighted display lamp of unit 112. On occasion, as will be described subsequently, line 111 may be used for voice intercommunication between the central office and the police station.

It is apparent from the above, therefore, that the novel alarm arrangement contemplated by the invention is effective in actuating an alarm simultaneously at both locations and in providing immediate indication at both locations of the particular telephone pay station at which an abnormal condition has been detected.

*Station scanning*

Coming now to a more detailed description of the specific illustrative embodiment of the invention with particular reference to FIGS. 2 to 6 of the drawing, the circuits illustrated are arranged in the so-called "detached contact" type of representation wherein, generally speaking, relay contacts are shown separated from the relay winding which controls the respective contact. This type of disclosure permits functional groups of circuitry to be shown separately, thus facilitating an understanding of the operational features involved. Each designation of a relay winding or the like is preceded by a numeral indicating the figure of the drawing in which the apparatus appears, for example the winding of relay 3ALM appearing in FIG. 3. Further, each contact designation is followed by a numeral in parentheses which indicates the figure of the drawing in which the contact appears, for example the designation "3ALM–1(2)" indicates that contact No. 1 of relay 3ALM appears in FIG. 2 while the relay winding, as pointed out above, appears in FIG. 3. In accord with usual circuit design, transfer contact pairs may be either early make-break (continuity) or early break-make (sequence transfer) as dictated by the particular circuit operational requirements.

It will be assumed now that switch 301 is closed momentarily in order to start the scanning, power supply switch 302 already being in closed position. Positive potential, which we will assume for example to be 37 volts, is normally connected from terminal 312 over leads 303 and 304 to one side of all the scanning relays 2S1, 2S2, et cetera, as well as to one side of the associated display lamps 2L1, 2L2, et cetera, and the two transfer relays 2TR2 and 2TR1. Now, upon momentary closure of switch 301, negative potential is connected from terminal 313, through switch 301 and over lead 306 to the other side of relay 2S1 and associated lamp 2L1; relay 2S1 operates and lamp 2L1 lights. Relay 2S1 upon operating locks through its make contact 2S1–1(2), the break contacts of the other scanning relays, and lead 201 returning to the power source. Also relay 2S1, operated, closes at the make contact of its transfer pair 2S1–2(2) an obvious operate path for relay 2TR1 which operates and prepares at its make contact 2TR1–1(2) an operate path for the next scanning relay 2S2.

Relay 3FF may or may not be operated at this moment depending upon which transistor, 308 or 311, of the flip-flop circuit is operated.

When relay 3FF does release a circuit is closed for operating relay 2S2 traced from terminal 313 of the power supply source, leads 201, 202, 203, break contact of jack 2J2, break contact 3ALM–1(2), the break contacts of respective transfer pairs 3FF–1(2), 2S15–1(2), 2S13–1(2), 2S11–1(2), 2S9–1(2), 2S7–1(2), 2S5–1(2), 2S3–1(2), make contact 2TR1–1(2), winding of relay 2S2, leads 304 and 303 to terminal 312 of the power supply source. Relay 2S2, upon operating, locks through the make contact of its transfer pair 2S2–1(2) and the break contacts of the respective transfer pairs of the higher numbered scanning relays, as transfer pair 2S3–2(2), 2S4–1(2) . . . 2S15–2(2), and the break contact of transfer pair 2S16–2(2) to lead 201; lamp 2L2 is also energized over this path.

Relay 2S1 releases and lamp 2L1 goes dark following operation of relay 2S2 as the energizing path for the lamp and the locking path for the relay are interrupted at the break contact of transfer pair 2S2–1(2). Relay 2TR1 releases following release of relay 2S1 as the operate path is interrupted at the make contact of transfer pair 2S1–2(2). Relay 2S2, operated, prepares an operate path for relay 2S3 at the make contact of transfer pair 2S2–2(2).

Additional contacts of the scanning relays are of course involved in circuit functions as the relays are operated and released, and these contacts and their functions will be described in detail subsequently.

Attention is now directed to the series of jacks 2J3, 2J5, 2J7, 2J9, 2J11, 2J13 and 2J15 which are provided in accordance with a novel feature of the invention. A "make-busy" plug may be used in conjunction with a selected one of these jacks whereby to select or segregate a particular group of stations for scanning. For purposes of description it will be assumed that in the present instance a make-busy plug has been inserted in jack 2J3 whereby to select the first three stations (associated relays 2S1, 2S2 and 2S3) for repeated scanning to the exclusion of the other stations. This feature permits concentrated scanning of certain groups of stations which may be particularly subject to trouble at any given time; in the event all fifteen stations are to be scanned, the make-busy plug will be inserted in jack 2J15.

Returning now to the description of the scanning operations, subsequent operation of relay 3FF closes a path for operating relay 2S3 traced from terminal 313 of power supply source, leads 201, 202, 203, break contact of jack 2J2, break contact 3ALM–1(2), make contact of transfer pair 3FF–1(2), break contact of respective transfer pairs 2S14–3(2), 2S12–3(2), 2S10–3(2), 2S8–3(2), 2S6–3(2), 2S4–3(2), make contact of transfer pair 2S2–2(2), winding of relay 2S3, leads 304 and 303 to terminal 312 of the power supply source. Relay 2S3 operates and locks through the make contact of its transfer pair 2S3–2(2) and the break contacts of transfer pairs of higher numbered scanning relays to lead 201; lamp 2L3 is activated over this same path. Relay 2S2 releases and lamp 2L2 goes dark following operation of relay 2S3 since the energizing path for the lamp and the holding path for the relay are interrupted at the break contact of transfer pair 2S3–2(2).

It will be recalled that it is being assumed that in the present instance a make-busy plug has been inserted in jack 2J3 whereby to attain concentrated scanning of the first three stations. Accordingly, relay 2S3, operated, prepares at the make contact of transfer pair 2S3–1(2) an operate path for relay 2S16. Now, when relay 3FF releases in its operate-release cycle under control of the flip-flop comprising transistors 308 and 311, a path is closed for operation of relay 2S16 traced from terminal 313 of the power supply source, leads 201, 202, 203, break contact of jack 2J2, break contact 3ALM–1(2), break contact of transfer pair 3FF–1(2), break contacts of respective transfer pairs 2S15–1(2), 2S13–1(2), 2S11–1(2), 2S9–1(2), 2S7–1(2), 2S5–1(2), make contact of transfer pair 2S3–1(2), make contact of jack 2J3 (operated by make-busy plug), lead 204, break contact of jack 2J15, winding of relay 2S16, leads 304 and 303 to terminal 312 of the power supply source. Relay 2S16, upon operating, locks through its make contact 2S16–3(2), lead 205, and the break contact of transfer pair 2S1–2(2) to lead 202.

Relay 2S3 releases and lamp 2L3 goes dark following operation of relay 2S16 since the energizing path for the lamp and the holding path for the relay are interrupted at the break contact of transfer pair 2S16–2(2). Relay 2S16, operated, closes at the make contact of transfer pair 2S16–2(2) an obvious operate path for relay 2TR2 which operates and prepares at make contact 2TR2–1(2) an operate path for relay 2S1. Upon the next operation of relay 3FF an operate path for relay 2S1 is closed from terminal 313 of the power supply source, leads 201, 202, 203, break contact of jack 2J2, break contact 3ALM–1(2), make contact of transfer pair 3FF–1(2), break contacts of respective transfer pairs 2S14–3(2), 2S12–3(2), 2S10–3(2), 2S8–3(2), 2S6–3(2), 2S4–3(2), 2S2–2(2), make contact 2TR2–1(2), winding of relay 2S1, leads 304 and 303 to terminal 312 of the power supply source. As before, relay 2S1 upon operating locks through its make contact 2S1–1(2) and lamp 2L1 is activated over this same path. Relay 2S16 releases following operation of relay 2S1 since the hold path is interrupted at the break contact of transfer pair 2S1–2(2) and the one scanning cycle for the first three stations has now been completed and the second cycle started. Additional cycles continue under control of relay 3FF which is controlled, in turn, by the transistor flip-flop.

The transistor flip-flop may be of conventional two-transistor design wherein oscillations are produced by virtue of feedback from the collector of the first transistor 308 to the base of the second transistor 311 and from the collector of the second transistor 311 to the base of the first transistor 308. The oscillations are applied to the winding of relay 3FF whereby to alternately operate and release the relay, the frequency of the oscillations being determined by the characteristics of capacitors 314 and 317 and resistors 321, 322 and 323.

The power supply circuit may also be of conventional design and is arranged to provide several different potentials as required by the overall circuit. It will be assumed, for purposes of description that 37-volts direct current is obtained across terminals 312 and 313 of the rectifier bridge. A smaller direct-current bias voltage, assumed to be 12 volts in the present instance, is obtained at terminal 318 by utilizing half of the bridge rectifier and winding 324 of the transformer secondary. Transformer winding 327 provides an open-circuit voltage assumed to be approximately 53-volts alternating current on line 328 which is utilized in a novel manner in connection with the transmission of signals to the auxiliary unit; this will be described subsequently.

*Detector—Its connection during scanning*

The detector per se includes a controlled silicon rectifier 501 which includes an anode 508, an anode gate 511 and a cathode 512; the anode gate when subjected to a predetermined potential causes the rectifier to become conductive and allow current flow between the anode and cathode. One application of such a controlled rectifier is disclosed, for example, in Patent 3,018,432, issued Jan. 23, 1962 to M. Palmer.

The respective resistors connected between the tip of each scanned station and lead 505, as resistors R1–15, R2–15, R1–14, R2–14 . . . R1–1, R2–1, are so arranged and of such a value that, together with the high resistance ground at the pay station, they are part of a voltage divider/bleeder which establishes a potential value at the junction of each pair of associated resistors which is at a relatively positive value at all times if no illegal entry has occurred at the pay station and the path to ground is intact and at a relatively negative value if illegal entry has occurred at the pay station and the path to ground has been interrupted, this refers to periods when the pay station is not in actual use and the tip is consequently not connected metallically to the central office machine switching equipment. This same resistor bleeder arrangement limits peak value of transients and induced voltages (such as RF) and establishes a sampling point (the junction of respectively paired resistors) which will not ordinarily exceed the operating limits of the detector controlled silicon rectifier 501.

Terminal 318 of the power supply circuit is connected over leads 335 and 336 to the negative terminal of a 45-volt bias battery. The positive terminal of this same battery is connected to the main distributing frame and through to central office battery which, as customary, is negative with respect to ground. This same terminal is connected to one end terminal of resistor 331; the junction of resistors 331 and 332 is so arranged with regard to other portions of the power supply circuit that the potential at the junction point is 2.5 volts negative with respect to the negative terminal of the bias battery. (47.5 volts negative with respect to the central office battery.) The junction point referred to is connected through resistor 502, which is of relatively high value, for example 470,000 ohms, to the anode gate 511 of controlled rectifier 501. This condition will cause rectifier 501 to conduct unless a positive potential (ground) is present on the common scanning lead 507 which is also connected to the anode gate through resistor 503 and diode 504.

As the scanning relays operate in sequence, as described above, contacts are closed whereby to connect the tip of each respective station through the first resistor of the associated resistor pair to the common scanning lead 507. For example, as scanning relay 2S1 operates, the tip of the first protected station is connected through resistor R1–1 and the make contact 2S1–3(4) to common scanning lead 507; as scanning relay 2S2 operates, the tip of the second protected station is connected through resistor R1–2 and the make contact 2S2–3(4) to lead 507; as scanning relay 2S3 operates, the tip of the third protected station is connected through resistor R1–3 and the make contact 2S3–3(4) to lead 507 and so on. As the scanning proceeds and assuming that each station scanned is found in normal condition, that is with the tip ground connection uninterrupted, the ground applied to common lead 507 for each station scanned will be effective to maintain controlled silicon rectifier 501 in a nonconducting condition.

*Abnormal condition detected—Local alarm operation*

Let us assume now, in order to further describe the novel arrangement contemplated, that an abnormal condition prevails at the third protected station and that the connection of the tip to the high resistance ground has been interrupted. Accordingly, as scanning relay 2S3 operates and make contact 2S3–3(4) closes, ground is not applied to common scanning lead 507. As pointed out above, the absence of this ground, normally applied through resistor R1–3, resistor 503 and diode 504, allows the bias applied through resistor 502 to anode gate 511 to cause the controlled rectifier 501 to become conductive and permit current flow between anode 508 and cathode 512. Accordingly, a path is closed for operation of relay 5DET from terminal 318 of the power supply circuit, lead 335, controlled rectifier 501, winding of relay 5DET, lead 334 to terminal 337 of the power supply circuit.

A second controlled silicon rectifier 513 is included in a time delay circuit which operates in conjunction with the detector. This device includes anode 514, cathode 517 and anode gate 518. Terminal 318 of the power supply circuit is also connected over line 329 to the negative terminal of the bias battery, this path including break contact 3ALM–2(3), make contact 3G–1(3), diode 521, resistors 522 and 523 and diode 524 to battery. A connection is also made from a point between the two resistors to anode gate 518 of controlled rectifier 513. So long as the above path remains closed, controlled rectifier 513 is held in nonconducting condition and current flow is prevented between anode 514 and cathode 517; the specific circuit functions involved will be described below. However, with relay 5DET operated as described above, a path is closed for operating relay 3ALM from the potential on lead 303, make contact 5DET–1(3), winding of relay 3ALM, break contact of jack 2J23 associated with scanning relay 2S3 and lamp 2L3, diode 211, make contact of transfer pair 2S3–2(2), break contacts of transfer pairs of respective higher numbered scanning relays, to lead 201. Relay 3ALM operates and interrupts at break contact 3ALM–1(2) the operate path to the scanning relays whereby to stop the scanning sequence; relay 2S3 remains operated over the locking path previously described.

Also, relay 3ALM operated interrupts at break contact 3ALM–2(3) the path through line 329 and this causes the time delay relay 5TD to operate after a controlled time interval; this delay interval may be, for example, four seconds. The involved circuit functions are as described hereinafter. While the path through line 329 is uninterrupted, that is before operation of relay 3ALM (relay 3G is normally operated), capacitor 527 is charged through diode 521, resistor 522 and back over line 338 to the power supply circuit. The potential on the capacitor is applied to the anode gate 518 of controlled rectifier 513 and holds the rectifier in nonconducting condition. Now, when the path is interrupted at break contact 3ALM–2(3) by operation of relay 3ALM, capacitor 527 discharges through resistor 523 and diode 524, and controlled rectifier 513 assumes a conductive condition after a short delay and a current flow path between anode 514 and cathode 517 is set up. Relay 5TD now operates over line 338, through controlled rectifier 513, winding of relay 5TD, leads 336 and 335 to terminal 318 of the power supply.

The extent of the delay introduced in the operation of relay 5TD is determined by the characteristics of capacitor 527, diode 521, resistor 522, resistor 523, and diode 524 and may be varied as dictated by circumstances. It is desirable that a definite, although usually short, delay be introduced at this point whereby to prevent "false alarms" resulting from transient conditions which temporarily simulate actual interruption of the tip connection to ground for a scanned station.

Relay 5TD, operated as described above, closes at make contact 5TD–2(5) a path for lighting ALARM lamp 5ALML and for actuating local alarm 528, the lamp energizing path being traced from terminal 312 of the power supply, leads 303, 304 and 532, lamp 5ALML, break contact of transfer pair 5IC–2(5), make contact 5TD–2(5), break contact of switch 533, leads 531, 202 and 201 to terminal 313 of the power supply. The audible alarm path is traced from power supply terminal 312, lead 536, alarm 528, make contact 5TD–2(5), break contact of switch 533, leads 531, 202 and 201 to terminal 313 of the power supply. At this same time, SCAN lamp 5SCANL goes dark as the energizing path therefor is interrupted at break contact 5TD–1(5).

The lighted ALARM lamp and the activated audible alarm 528 give indication at the central office that an abnormal condition has been detected at the telephone pay station with which scanning relay 2S3 and lamp 2L3 are associated. After appropriate action has been taken, scanning of the other stations may be resumed by inserting a make-busy plug in jack 2J23 which is associated with the scanning path of the "alarmed" station; this action serves to bypass scanning relay 2S3 and to cause resumption of the sequential operation of the other scanning relays. The path for operation of relay 3ALM is interrupted at the break contact of jack 2J23 whereupon relay 3ALM releases and recloses at break contact 3ALM–2(3) the path over lead 329 to the timing circuit. Capacitor 527 recharges, controlled rectifier 513 is restored to its nonconducting condition and relay 5TD releases.

Also, relay 3ALM, released, recloses at break contact 3ALM–1(2) the path for supply of potential from lead 203 to the paths supplied by transfer pair 3FF–1(2) of relay 3FF, and sequential operation of the scanning relays, is resumed. Following release of relay 5TD, the paths for lighting lamp 5ALML and for activating alarm 528 are interrupted at make contact 5TD–2(5), and lamp 5SCANL is relighted over a path closed at break contact 5TD–1(5).

*Operation of display and alarm at police station*

As pointed out above, a novel and advantageous feature of the contemplated arrangement provides for operation of a display at a remote point, for example the local police station, in step with the scanning operations controlled from the central office as well as for an alarm indication at the remote area when a protected telephone pay station is detected having an abnormal condition.

It will be recalled from the previous brief description of the power supply circuit that an open-circuit voltage assumed to be approximately 53-volts alternating current is supplied over lead 328. One end of lead 328 is connected through transformer winding 327 and rectifier bridge 341 to ground while the other end is connected to three parallel lines 401, 402 and 403, the connection to line 402 including diode 404 and that to line 403 including diode 407. Oppositely poled diodes 404 and 407 provide −DC and +DC respectively on lines 402 and 403 while alternating current remains on line 401. Various combinations of these voltages are utilized for actuation of the units at the remote station in a novel manner now to be described.

It will be observed that there are associated with each scanning relay, in addition to those contacts already described, two other pairs of transfer contacts. For example, transfer pairs 2S1–4(4) and 2S1–5(4) are associated with scanning relay 2S1; transfer pairs 2S2–4(4) and 2S2–5(4) are associated with scanning relay 2S2 and so on. (The association of these transfer pairs with the respective scanning relay is, of course, apparent from the contact designations.) Various combinations of the voltages on lines 401, 402 and 403 are applied to line 408 through this matrix of transfer contacts in a manner described below. It will be understood that line 408 corresponds to line 111 of FIG. 1.

Figure 6:
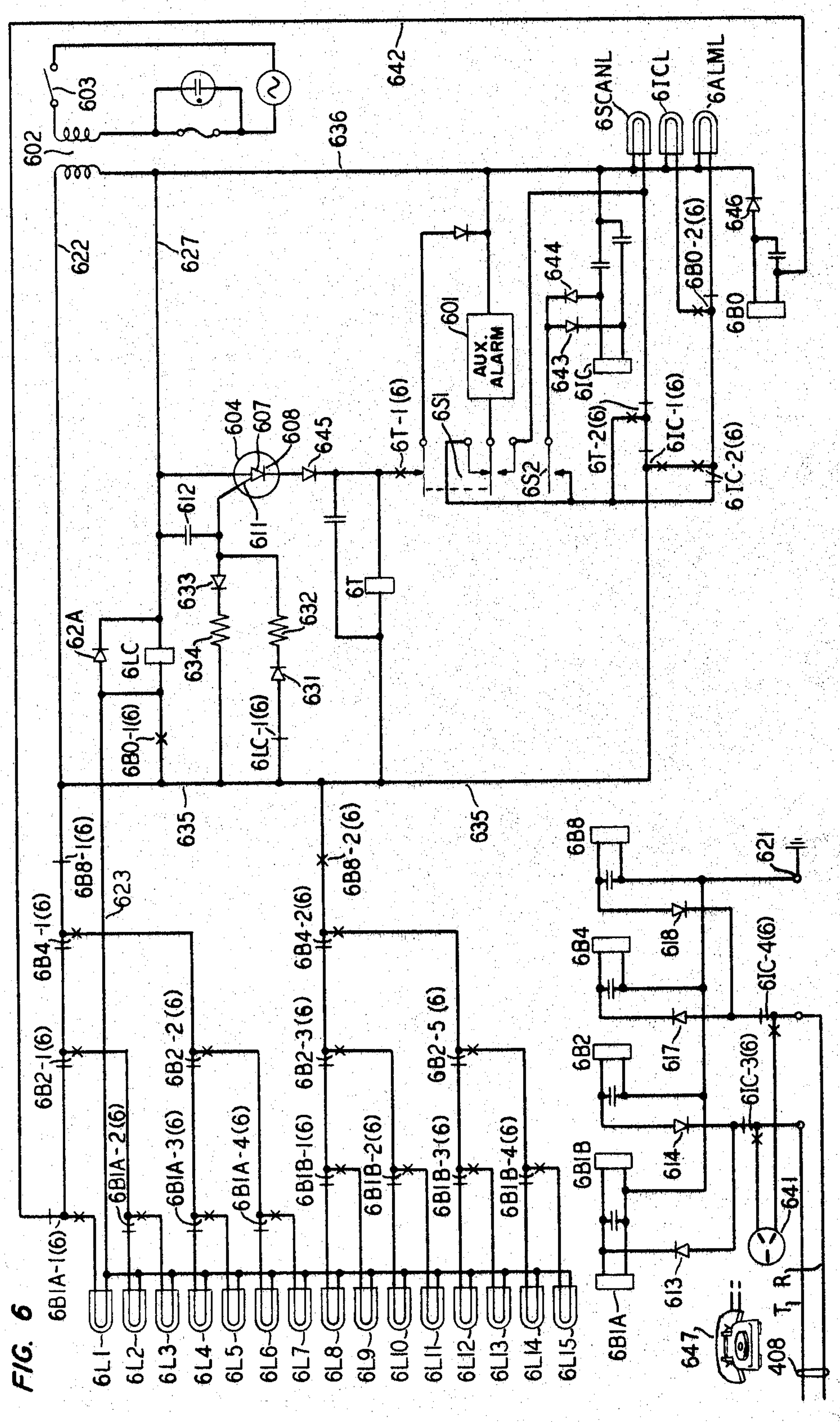
FIG. 6 shows the arrangement of the display and alarm units at the auxiliary alarm location.

Referring now for the moment to FIG. 6, the arrangement of the auxiliary display and timer unit and that of the auxiliary alarm are illustrated. It will be noted that display lamps 6L1 to 6L15 inclusive are provided which correspond respectively to the scanning relays 2S1 to 2S15 and associated lamps 2L1 to 2L15 of FIG. 2. The display lamps of the auxiliary unit are lighted in step with operation of the scanning relays and lighting of the display lamps at the central office, and the auxiliary alarm 601 is operated when alarm 528 at the central office operates. (Alarm 528 corresponds to local alarm 108 of FIG. 1 and alarm 601 corresponds to auxiliary alarm 113 of FIG. 1.)

The necessary potentials for energizing the auxiliary units are obtained through transformer 602 when power switch 603 is closed. Controlled silicon rectifier 604 is provided with anode 607, cathode 608 and anode gate 611; the device is normally held in nonconductive condition by the charge on capacitor 612 which is applied to anode gate 611. The lamps of the group 6L1 to 6L15 which are operated are the binary total of the relays operated in the group 6B1A, 6B1B, 6B2, 6B4 and 6B8. Operation of any lamp also closes a path for operating relay 6LC. The relays operated in the group 6B1A etc. depend upon the particular potential or combination of potentials transmitted over the line 408 as each station is scanned; the potential depends, in turn, upon the interconnection of the transfer pairs included in the matrix and the lines 401, 402 and 403. For the specific illustrative embodiment of the invention described, the following relationships prevail, it being understood that the "Protected Station No." in each instance corresponds to the scanning relay operated.

| Protected Station No. | Potential on Line 408 | | Binary Relay Operated at Police Station |
|---|---|---|---|
| | Tip | Ring | |
| 1 | + | -------- | 6B1A, 6B1B. |
| 2 | − | -------- | 6B2. |
| 3 | AC | -------- | 6B1A, 6B1B, 6B2. |
| 4 | | + | 6B4. |
| 5 | + | + | 6B1A, 6B1B, 6B4. |
| 6 | − | + | 6B2, 6B4. |
| 7 | AC | + | 6B1A, 6B1B, 6B2, 6B4. |
| 8 | | − | 6B8. |
| 9 | + | − | 6B1A, 6B1B, 6B8. |
| 10 | − | − | 6B2, 6B8. |
| 11 | AC | − | 6B1A, 6B1B, 6B2, 6B8. |
| 12 | | AC | 6B4, 6B8. |
| 13 | + | AC | 6B1A, 6B1B, 6B4, 6B8. |
| 14 | − | AC | 6B2, 6B4, 6B8. |
| 15 | AC | AC | 6B1A, 6B1B, 6B2, 6B4, 6B8. |

For further description of the operations at the remote area (police station) let us assume that we again have sequential operation of scanning relays 2S1, 2S2, and 2S3 with an abnormal condition being detected at station No. 3 when relay 2S3 operates.

As scanning relay 2S1 operates closing contacts of transfer pairs 2S1–5(4) and 2S1–4(4) a +DC pulse will be transmitted over the tip side of line 408 and no potential will be transmitted over the ring side. This positive pulse operates binary relays 6B1A and 6B1B through the break contact of transfer pair 5IC–3(6), diode 613, windings of relays 6B1A and 6B1B, to ground at terminal 621. Lamp 6L1 now lights over a path from the power transformer 602, lead 622, break contact 6B8–1(6), break contacts of transfer pairs 6B4–1(6), 6B2–1(6), make contact of transfer pair 6B1A–1(6), lamp 6L1, lead 623, winding of relay 6LC, lead 627 to transformer 602. Lamp 6L1 of the auxiliary display unit accordingly lights in step with lamp 2L1 at the central office and relay 6LC also operates at this time.

Relay 6LC, operated, opens at break contact 6LC–1(6) the path through diode 631 and resistor 632 and permits capacitor 612 to start discharging through diode 633 and resistor 634. However, an appreciable interval, for example seven seconds, is required for the capacitor to discharge sufficiently to permit control rectifier 604 to become conductive and assuming that the sequential scanning continues, relay 6LC will not remain operated for the required interval until such time as the scanning is halted due to detection of a station with a trouble indication. (For normal scanning, that is in the absence of detection of an abnormal condition at a scanned station, approximately one second elapses between the operation of each respective scanning relay.)

At this time scanning lamp 6SCANL at the auxiliary location or second alarm center (police station) is lighted over leads 622 and 635, the break contacts of respective transfer pairs 6IC–1(6) and 6T–2(6), lamp 6SCANL and lead 636.

Now as scanning continues and relay 2S2 operates, a —DC pulse is transmitted through the make contact of transfer pair 2S2–4(4) to the tip of line 408. This negative pulse will pass through diode 614 to operate relay 6B2 and auxiliary display lamp 6L2 will operate in step with lamp 2L2 over a path from lead 622, break contact 6B8–1(6), break contact of transfer pair 6B4–1(6), make contact of transfer pair 6B2–1(6), break contact of transfer pair 6B1A–2(6), lamp 6L2, lead 623, winding of relay 6LC, lead 627. As before, relay 6LC operates and starts the discharge of capacitor 612 but as scanning continues at its normal rate, the discharge of capacitor 612 is halted before controlled rectifier 604 becomes conductive.

When relay 2S3 operates an alternating-current pulse is applied through the make contact of transfer pair 2S3–4(4) to the tip of line 408 and this will pass through diode 613 to operate relays 6B1A and 6B1B and through diode 614 to operate relay 6B2. Lamp 6L3 will now be lighted in step with lamp 2L3 over lead 622, break contact 6B8–1(6), break contact of transfer pair 6B4–1(6), make contacts of respective transfer pairs 6B2–1(6) and 6B1A–2(6), lamp 6L3, lead 623, relay 6LC, and lead 627; relay 6LC operates as before.

It will be recalled from previous description that it has been assumed that an abnormal condition has been detected at the third telephone pay station scanned and that scanning is halted with relay 2S3 operated. Lamp 2L3 at the main scanning unit remains lighted, and since relays 6B1A, 6B1B and 6B2 remain operated, lamp 6L3 of the auxiliary display unit also remains lighted and relay 6LC is held operated. Capacitor 612 continues to discharge therefore, until the point is reached when insufficient potential is applied to anode gate 611 to hold controlled rectifier 604 is nonconductive condition; the device becomes conductive and permits current flow between anode 607 and cathode 608.

Relay 6T now operates from lead 627, controlled rectifier 604, diode 654, winding of relay 6T, leads 635 and 622, and, upon operating, locks from lead 635 to lead 636 through its make contact 6T–1(6) and the upper break contact of switch 6S1. A path is now closed for operating the auxiliary alarm 601 from leads 622 and 635, break contact of transfer pair 6IC–1(6), make contact of transfer pair 6T–2(6), lower break contact of switch 6S1, alarm 601 to lead 636; a shunt section of this path passes through the break contacts of respective transfer pairs 6IC–2(6) and 6BO–2(6) to light the ALARM lamp 6ALML. Lamp 6SCANL will go dark as the previously-described operate path is interrupted at the 6T–2(6) transfer contacts. The actuation of alarm 601 and lighting of lamp 6ALML provide immediate indication at the police station that a protected telephone pay station with an abnormal condition has been detected, the particular station involved being identified by the steadily lighted lamp 6L3. Investigators may be dispatched immediately therefore from both the telephone central office and the police station.

The auxiliary alarm 601 may be temporarily silenced by operating switch 6S1 whereby to open the alarm energizing path at the lower break contact of the switch. After the scanning has been resumed the lamps of the auxiliary display unit will resume operating in step with the scanning; relay 6LC will operate as before and relay 6T will release, controlled rectified 604 being restored to nonconductive condition. Lamp 6ALML will go dark as its energizing path is interrupted at the make contact of transfer pair 6T–2(6) and lamp 6SCANL is relighted through the break contact of the same transfer pair. In the event the attendant has neglected to restore switch 6S1 to normal position, alarm 601 will be sounded at this time as a reminder over a path completed at the make contact of the switch.

The manner in which the other lamps of the auxiliary display unit are lighted in step with the scanning will be readily apparent. For example, assuming that station No. 6 is being scanned and that relay 2S6 has operated, —DC will be applied over the tip of line 408 and +DC will be applied over the ring. The minus pulse on the tip will operate relay 6B2 and the plus pulse on the ring will operate relay 6B4. Accordingly, lamp 6L6 will be lighted over a path from lead 622, break contact 6B8–1(6), make contact of transfer pair 6B4–1(6), make contact of transfer pair 6B2–2(6), break contact of transfer pair 6B1A–4(6), lamp 6L6 to lead 623.

Again, assuming that telephone pay station No. 12 is being scanned and that relay 2S12 has operated, alternating current will be applied to the ring of line 408; this will operate relays 6B4 and 6B8. Accordingly, lamp 6L12 will be lighted over a path from leads 622 and 635, make contact 6B8–2(6), make contact of transfer pair 6B4–2(6), break contacts of respective transfer pairs 6B2–5(6) and 6B1–3(6), lamp 6L12 to lead 623. When relay 2S15 is operated for scanning pay station No. 15, alternating current will be applied to both tip and ring of line 408 and this will operate all relays in the group 6B1A, 6B1B, 6B2, 6B4 and 6B8. Lamp 6L15 will be lighted over a path from leads 622 and 635, make contact 6B8–2(6), make contacts of respective transfer pairs 6B4–2(6), 6B2–5(6), 6B1B–4(6), lamp 6L15 to lead 623.

*Use of line 408 for intercom*

As previously pointed out, an important and novel feature of my invention provides that the special signaling line between the two alarm centers, that is the central office and the police station, may on occasion be utilized for voice intercommunication between the two locations. For this purpose suitable telephone sets, such as 537 and 647, are connected to the line through jacks 534 and 641, and, when originating a call from the central office, switch 535 is moved to the INTERCOM position whereby to open the central office end of line 408 at the lower two breaks contacts of the switch and to close jack 534 through to the MDF at the lower two make contacts of the switch. Switch 411 may also be operated to a position whereby the potential transmitting leads are terminated in respective resistors 412 and 413. Since no potential signals are transmitted over line 408, we have the equivalent of binary zero; and, none of the binary relays at the police station, 6B1A, 6B1B, 6B2, 6B4 or 6B8, is operated.

Relay 6BO operates from lead 636, diode 646, winding of relay 6BO, lead 642, break contacts of respective transfer pairs 6B1A–1(6), 6B2–1(6), and 6B4–1(6), break contact 6B8–1(6), to lead 622. Relay 6BO, operated, closes at make contact 6BO-1(6) a path to operate relay 6LC from leads 622 and 627. Relay 6LC, operated, opens at break contact 6LC–1(6) the path through diodes 631 and resistor 632 permitting capacitor 612 to discharge through diode 633 and resistor 634. After capacitor 612 has sufficiently discharged, controlled rectifier 604 changes to a conductive condition and relay 6T operates. INTERCOM lamp 6ICL now lights over a path from leads 622 and 635, break contact of transfer pair 6IC–1(6), make contact of transfer pair 6T–2(6), break contact of transfer pair 6IC–2(6), make contact of transfer pair 6BO–2(6), lamp 6ICL to lead 636; the energizing path of lamp 6ALML is interrupted at this same time at the break contact of transfer pair 6BO–2(6). The auxiliary alarm 601 also operates at this time being activated from the make contact of transfer pair 6T–2(6) and the lower break contact of switch 6S1.

The attendant at the police station, being alerted by the alarm 601 and the lighted lamp 6ICL, now closes switch 6S2 whereupon relay 6IC operates from leads 622 and 635, break contact of transfer pair 6IC–1(6), make contact of transfer pair 6T–2(6), make contact of switch 6S2, winding of relay 6IC to lead 636; diodes 643 and 644 provide a voltage doubler action in this path.

Relay 6IC, operated, deactivates auxiliary alarm 601 by interrupting the energizing path therefor at the break contact of transfer pair 6IC–1(6); lamp 6ICL remains lighted, however, over a path including the make contacts of respective transfer pairs 6IC–1(6), 6IC–2(6) and 6BO–2(6). Also, relay 6IC, upon operating, closes telephone jack 641 through the make contacts of respective transfer pairs 6IC–3(6) and 6IC–4(6) to the tip and ring of line 408 whereby to complete a talking path between the telephone sets plugged into jacks 534 and 641, respectively. Restoration of switch 6S2 to its normal, open position, will restore the circuit to normal condition; switch 535 at the central office would, of course, be returned to normal position before the resumption of scanning signals over line 408 to the auxiliary location.

Intercom calls may be initiated at the remote location also. Operation or relay 6IC follows closure of switch 6S2 and this transfers, at the make contacts of transfer pairs 6IC–3(6) and 6IC–4(6), the tip and ring of line 408 from the binary relays, 6B1A etc., to telephone jack 641. At the central office the tip and ring of line 408 normally loop through key 535 and are connected to the matrix comprising contacts of the various sequential relays. Relay 3G is normally held operated due to current flow associated with the several binary count voltages on line 328. The open-circuit condition at the remote location resulting from transfer of line 408 to jack 641 causes relay 3G to release. Relay 3G, released, closes at break contact 3G–2(3) an operate path for relay 5IC and opens lead 329 at make contact 3G–1(3), permitting capacitor 527 to discharge through resistor 523 and diode 524 as previously described. After capacitor 527 has sufficiently discharged, controlled rectifier 513 changes to conductive condition and relay 5TD operates. The 5ICL lamp lights and alarm 528 operates over a path from terminal 312 of the rectifier, to leads 303 and 536, leads 304 and 532, lamp 5ICL, make contacts 5IC–1(5) and 5IC–2(5) and from alarm 528, both operating through make contact 5TD–2(5), break contact of switch 533, leads 531, 202, and 201 to terminal 313 of the power supply.

The attendant at the central office, alerted by operation of alarm 528 and lighted lamp 5ICL to initiation of an intercom call at the police station, moves switch 535 to the TALK position whereby to disconnect the central office end of the line and to connect telephone jack 534 through the MDF to the outgoing end of the line. Also, this operation of switch 535 (which is mechanically coupled to switch 533) releases relay 5IC by opening the operate path at the break contact of switch 533; this silences alarm 528 by interrupting the energizing path at the make contacts of transfer pairs 5IC–1(5) and 5IC–2(5). The two attendants may now converse over the line. Lamp 5ICL remains lighted during the INTERCOM connection through the break contact of transfer pair 5IC–1(5) and the make contact of switch 533.

*Manual operation*

On occasion, particularly for test purposes, control of the sequential scanning can be transferred from the automatic control by relay 3FF to manual control by "odd" and "even" keys, or switches, 207 and 208 which are manually operated. By insertion of a make-busy plug in jack 2J2, lead 203 is transferred to make contacts of keys 207 and 208 which may then be manually operated as desired for observing and testing purposes.

In the above description of the contemplated arrangement, scanning of only the first three stations was described in detail, it being assumed for purposes of illustration that a make-busy plug had been inserted in jack 2J3 in order to concentrate the scanning on the three stations. It will be understood that scanning of additional groups of stations as determined by closure of other jacks or scanning of the entire fifteen stations is accomplished in the same general manner as that described. By way of general illustration let it be assumed that a make-busy plug is inserted in jack 2J7 whereby to attain concentrated scanning of the first seven stations. Operation of relay 2S7 would normally close at the make contact of transfer pair 2S7–1(2) an operate path for relay 2S8 on the next even pulse. However, when jack 2J7 is closed by insertion of the make-busy plug, this path is transferred through the make contact of jack 2J7 and the break contact of jack 2J15 to the operate path of relay 2S16 which operates as previously described above to start a second cycle of scanning with station No. 1.

It is to be understood that the above-described arrangements are illustrative of the principles of the invention. Numerous other arrangements may be devised by those skilled in the art without departing from the spirit and scope of the invention.

What is claimed is:

1. In an alarm system for telephone pay stations, a plurality of separated coin pay stations, means associated with each of said pay stations for indicating an abnormal condition thereat, a first alarm center and a second alarm center, means at said first alarm center for continuously scanning said coin pay stations for detecting indication of an abnormal condition, a plurality of lamps at said first alarm center corresponding respectively to said coin pay stations, means for lighting each lamp as the respectively associated pay station is scanned, a plurality of lamps at said second alarm center corresponding respectively to said lamps at said first alarm center and to said coin pay stations, alarm means at said first and said second alarm centers, means for lighting each lamp at said second alarm center in step with the corresponding lamp at said first alarm center, means effective upon detection of an abnormal condition at a scanned station for simultaneously energizing the alarms at both alarm centers, and means at said first alarm center effective upon detection of an abnormal condition at a scanned station for halting said scanning.

2. In an alarm system for telephone pay stations, the combination defined by claim 1 further characterized in means effective while the scanning is halted for maintaining in lighted condition the respective lamp at each alarm center which corresponds to the scanned station at which an abnormal condition has been detected.

3. In an alarm system for telephone pay stations, the combination defined by claim 2 further characterized in means for bypassing the scanning path associated with the respective scanned station at which an abnormal condition has been detected whereby scanning of the other coin pay stations to the exclusion of said respective scanned station may continue.

4. In an alarm system for telephone pay stations, a plurality of separated coin pay stations, means associated with each of said pay stations for indicating an abnormal condition thereat, a first alarm center and a second alarm center, a line connecting said alarm centers and including a tip lead and a ring lead, means at said first alarm center for continuously scanning said coin pay stations for detecting indication of an abnormal condition said last-mentioned means including a plurality of sequentially operable relays corresponding respectively to said coin pay stations, a plurality of lamps at said first alarm center corresponding respectively to said relays and corresponding also to said coin pay stations, means for lighting each lamp as the respectively associated relay is operated and the associated pay station is scanned, alarm means at said first and at said second alarm centers, a plurality of lamps at said second alarm center corresponding respectively to said relays and lamps at said first alarm center and to said coin pay stations, means for lighting each lamp at said second alarm center in step with the corresponding lamp at said first alarm center, said last-mentioned means including means controlled by said sequentially operable relays for applying potential pulses to said line, means effective upon detection of an abnormal condition at a scanned station for halting the scanning and energizing the alarms at both alarm centers, and means for maintaining in steadily lighted condition the respective lamp at each alarm center which corresponds to the respective scanned station at which an abnormal condition has been detected.

5. In an alarm system for telephone pay stations: a plurality of separated coin pay stations; means associated with each of said pay stations for indicating an abnormal condition thereat; a first alarm center and a second alarm center; a line connecting said alarm centers and including a tip lead and a ring lead; means at said first alarm center for continuously scanning said coin pay stations for detecting indication of an abnormal condition; said last-mentioned means including a plurality of sequentially operable relays corresponding respectively to said coin pay stations; a plurality of lamps at said first alarm center corresponding respectively to said relays and corresponding also to said coin pay stations; means for lighting each lamp as the respectively associated relay is operated and the associated pay station is scanned; alarm means at said first and at said second alarm centers; a plurality of lamps at said second alarm center corresponding respectively to said relays and lamps at said first alarm center and to said coin pay stations; means for lighting each lamp at said second alarm center in step with the corresponding lamp at said first alarm center; said last-mentioned means including means controlled by said sequentially operable relays for applying potential pulses to said line; said last-mentioned controlled means including a source of alternating-current potential, a source of positive direct-current potential and a source of negative direct-current potential, and a matrix including contacts associated with respective ones of said relays connected between said sources and the tip and ring leads of said line whereby as said relays operate different combinations of potentials are transmitted over said line to said second alarm center; means effective upon detection of an abnormal condition at a scanned station for halting the scanning and energizing the alarms at both alarm centers; and, means for maintaining in steadily lighted condition the respective lamp at each alarm center which corresponds to the respective scanned station at which an abnormal condition has been detected.

6. In an alarm system for telephone pay stations, the combination defined by claim 5 further characterized in that said means for lighting each lamp at said second alarm center in step with the corresponding lamp at said first alarm center includes a group of relays and means for operating said relays in predetermined combinations in accordance with the combinations of potentials transmitted over said line.

7. In an alarm system for telephone pay stations, the combination defined by claim 6 further characterized in the provision of a telephone set at said first alarm center, switch means effective when operated to connect said telephone set to said line and to disconnect said contact matrix from said line, means at said second alarm center effective upon operation of said switch means to activate the alarm means at said second alarm center, a telephone set at said second alarm center, and additional means at said second alarm center effective when operated to silence said last-mentioned alarm means and to connect said last-mentioned telephone set to said line.

8. In an alarm system for telephone pay stations, the combination defined by claim 4 further characterized in means whereby a particular group of said separated coin pay stations may be temporarily segregated for repeated scanning to the exclusion of the remainder of said stations.

9. In an alarm system for telephone pay stations, the combination defined by claim 4 further characterized in the provision of manually operated means for controlling the sequential operation of said relays.

References Cited

UNITED STATES PATENTS

| | | | |
|---|---|---|---|
| 2,605,342 | 7/1952 | Spurling | 340—276 X |
| 2,842,753 | 7/1958 | Ewen | 340—248 X |
| 2,919,307 | 12/1959 | Bachelet et al. | 179—5 |
| 2,980,898 | 4/1961 | Mason et al. | 340—412 X |

ROBERT L. GRIFFIN, *Primary Examiner.*

W. S. FROMMER, *Assistant Examiner.*